(12) United States Patent
Gross et al.

(10) Patent No.: US 9,449,511 B2
(45) Date of Patent: Sep. 20, 2016

(54) SYSTEM AND METHOD FOR AUTOMATED SEQUENCING OF VEHICLE UNDER LOW SPEED CONDITIONS FROM VIDEO

(71) Applicant: XEROX CORPORATION, Norwalk, CT (US)

(72) Inventors: Eric Gross, Rochester, NY (US); Aaron Michael Burry, Ontario, NY (US); Peter Paul, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 631 days.

(21) Appl. No.: 13/975,245

(22) Filed: Aug. 23, 2013

(65) Prior Publication Data

US 2015/0054957 A1 Feb. 26, 2015

(51) Int. Cl.
*H04N 5/232* (2006.01)
*G06Q 30/00* (2012.01)
*E04H 3/02* (2006.01)
*G08G 1/017* (2006.01)
*G06K 9/00* (2006.01)

(52) U.S. Cl.
CPC ......... *G08G 1/0175* (2013.01); *G06K 9/00785* (2013.01)

(58) Field of Classification Search
CPC ......... G06Q 30/00; E04H 3/02; H04N 5/232
See application file for complete search history.

(56) References Cited

U.S. PATENT DOCUMENTS

2007/0088620 A1\* 4/2007 Tengler ............... G06Q 10/087
705/15

\* cited by examiner

*Primary Examiner* — Sath V Perungavoor
*Assistant Examiner* — Patricia I Young
(74) *Attorney, Agent, or Firm* — MH2 Technology Law Group LLP

(57) ABSTRACT

A computer-implemented method, system, and computer-readable medium is disclosed for determining a sequence order for vehicles in one or more image frames from an operational video, the operational video acquired from a fixed video camera comprising a field of view associated with a vehicle merge area where upstream traffic from a first lane and upstream traffic from a second lane merge to a single lane. The method can include obtaining operational video from a fixed video camera; detecting, within a region of interest (ROI) of the one or more image frames from the operational video, a first area and a second area in the vehicle merge area using a trained classifier that is trained to detect the first area and the second area; and determining the sequence order of the vehicles based on the first area and the second area that are detected.

19 Claims, 3 Drawing Sheets

| TABLE 1 | | |
|---|---|---|
| ORDER | ORDER COMPLETE SEQUENCE | SINGLE LANE SEQUENCE* |
| ORDER_LANE_A_1 | 1 | 1 |
| ORDER_LANE_A_2 | 2 | 2 |
| ORDER_LANE_B_1 | 3 | 3 |
| ORDER_LANE_A_3 | 4 | 4 |
| ORDER_LANE_A_4 | 6 | 5 |
| ORDER_LANE_B_2 | 5 | 6 |
| ORDER_LANE_B_3 | 7 | 7 |
| ORDER_LANE_B_4 | 9 | 9 |
| ORDER_LANE_A_5 | 8 | 8 |
| ORDER_LANE_B_5 | 10 | 11 |
| ORDER_LANE_A_6 | 11 | 10 |
| *THE ORDER (OR SEQUENCE) IN WHICH THE CARS PASS THE PAY AND PICK UP WINDOW | | |

SYSTEM AND METHOD FOR AUTOMATED SEQUENCING OF VEHICLE UNDER LOW SPEED CONDITIONS FROM VIDEO

BACKGROUND

The present disclosure relates to a video-based method and system for drive-through order management, and in particular to a vehicle detection/localization approach for queued vehicle traffic using images/videos obtained from a fixed video camera. However, it is to be appreciated that the present exemplary embodiments are also applicable to other like applications.

A "drive-through" is a type of service provided by a business such as, for example, fast-food restaurant, bank, pharmacy, and coffee shop that permits a customer to purchase a product without leaving their vehicle. Such drive-through services provide the customer with fast and convenient service while increasing the number of customers that may be served through conventional walk-in transactions. Orders can be generally placed utilizing a microphone and picked up in person at the window. As the order is being placed, an order-taker enters the order information into an order management system. The order information can be displayed on a display such that the order can be assembled by a runner.

Conventional ordering paradigms utilize a single-queue approach. The problem associated with such approach is that the vehicles can get out of order between the time the order is placed and the vehicle receives the product. Additionally, such prior art approaches do not ensure that the correct product is being delivered to the vehicle that placed the order which reduces order accuracy and efficiency. Such problems are exacerbated in highly trafficked locations where multiple lanes of order placement exist for each order processing window which result in decreased customer satisfaction and significant loss of revenues.

In some drive through service architectures, there have been recent initiatives to include side-by-side order points. The intention of two lanes is to accommodate more cars in the queue, and to reduce the number of "drive off" instances (a customer arrives, concludes that the line is too long, and so decides to leave). In most of these multi-lane drive-thru architectures, the line starts as a single lane that splits into two separate lanes with ordering consoles, and then the two lanes merge again into a single lane for payment and pickup. The two separate ordering points and re-merger of the lanes can cause a mismatch between the sequence in which the food orders were taken and the sequence of cars that arrive at the pay and pickup counters. This "out of sequencing" can result in the wrong expenses charged to the customer and/or the delivery of the wrong food to the customer (contributing significantly to customer dissatisfaction). Even if the accuracy of the delivered orders is maintained, these out of sequence events result in significant time loss (inefficiency) as the employees re-sequence the orders to match the vehicles in the queue.

Based on the foregoing, it is believed that a need exists for an improved system and method for providing signature based drive-through order tracking, as described in greater detail herein.

SUMMARY

In implementations, a computer-implemented method is disclosed for determining a sequence order for vehicles in one or more image frames from an operational video, the operational video acquired from a fixed video comprising a field of view associated with a vehicle merge area where upstream traffic from a first lane and upstream traffic from a second lane merge to a single lane. The method comprises obtaining operational video from a fixed video camera; detecting, within a region of interest (ROI) of the one or more image frames from the operational video, a first area and a second area in the vehicle merge area using a trained classifier that is trained to detect the first area and the second area, wherein traffic from the first lane and no traffic from the second lane traverse the first area and wherein traffic from the second lane and no traffic from the first lane traverse the second area; and determining the sequence order of the vehicles based on the first area and the second area that are detected.

In implementations, the method further comprises training the classifier, wherein training the classifier comprises: obtaining additional video from the fixed video camera; extracting one or more samples from the additional video that was obtained; extracting a set of features from the samples; and training the classifier via machine optimization techniques to identify spatial regions of the first area and the second area as trip points.

In implementations, the first area is chosen such that if the first area is obscured, then there is a high probability that the first area is obscured by a vehicle that is emerging from the first lane and the second area is chosen such that if the second area is obscured, then there is a high probability that the second area is obscured by a vehicle that is emerging from the second lane. In implementations, wherein the high probability is at least about 90% or about 95%.

In implementations, the first area is chosen such that if the first area is obscured, then any vehicle in the second lane that has not obscured the second area will be sequenced somewhere after the first area obscuring vehicle once the first vehicle and the second vehicle have merged into a single lane.

In implementations, the second area is chosen such that if the second area is obscured, then any vehicle in the first lane that has not obscured the first area will be sequenced somewhere after the second area obscuring vehicle once the first vehicle and the second vehicle have merged into a single lane.

In implementations, the first area and the second area are chosen such that the first area and the second area are not simultaneously obscured.

In implementations, a vehicle sequence ordering system is disclosed and that is associated with a vehicle merge area where upstream traffic from a first lane and upstream traffic from a second lane merge to a single lane region. The system comprises a fixed video camera including a field of view associated with the vehicle merge area; and a controller operatively associated with the fixed video camera, the controller configured to execute computer instructions to perform a process of determining a sequence order for vehicles in one or more image frames from an operational video, the operational video acquired from the fixed video camera comprising a field of view associated with the vehicle merge area comprising: obtaining operational video from a fixed video camera; detecting, within a region of interest (ROI) of the one or more image frames from the operational video, a first area and a second area in the vehicle merge area using a trained classifier that is trained to detect the first area and the second area, wherein traffic from the first lane and no traffic from the second lane traverse the first area and wherein traffic from the second lane and no traffic from the first lane traverse the second area; and determining the sequence order of the vehicles based on the first area and the second area that are detected.

In implementations, the computer instructions further comprise training the classifier, wherein training the classifier comprises: obtaining additional video from the fixed video camera; extracting one or more samples from the additional video that was obtained; extracting a set of features from the samples; and training the classifier via machine optimization techniques to identify spatial regions of the first area and the second area as trip points.

In implementations, the first area is chosen such that if the first area is obscured, then there is a high probability that the first area is obscured by a vehicle that is emerging from the first lane and the second area is chosen such that if the second area is obscured, then there is a high probability that the second area is obscured by a vehicle that is emerging from the second lane.

In implementations, the first area is chosen such that if the first area is obscured, then any vehicle in the second lane that has not obscured the second area will be sequenced somewhere after the first area obscuring vehicle once the first vehicle and the second vehicle have merged into a single lane and the second area is chosen such that if the second area is obscured, then any vehicle in the first lane that has not obscured the first area will be sequenced somewhere after the second area obscuring vehicle once the first vehicle and the second vehicle have merged into a single lane.

In implementations, the first area and the second area are chosen such that the first area and the second area are not simultaneously obscured.

In implementations, A non-transitory computer readable storage medium is disclosed that comprises instructions that cause one or more processors to perform a method for determining a sequence order for vehicles in one or more image frames from an operational video, the operational video acquired from a fixed video camera comprising a field of view associated with a vehicle merge area where upstream traffic from a first lane and upstream traffic from a second lane merge to a single lane, the method comprising: obtaining operational video from the fixed video camera; detecting, within a region of interest (ROI) of the one or more image frames from the operational video, a first area and a second area in the vehicle merge area using a trained classifier that is trained to detect the first area and the second area, wherein traffic from the first lane and no traffic from the second lane traverse the first area and wherein traffic from the second lane and no traffic from the first lane traverse the second area; and determining the sequence order of the vehicles based on the first area and the second area that are detected.

In implementations, the first area is chosen such that if the first area is obscured, then there is a high probability that the first area is obscured by a vehicle that is emerging from the first lane and the second area is chosen such that if the second area is obscured, then there is a high probability that the second area is obscured by a vehicle that is emerging from the second lane.

DETAILED DESCRIPTION

Figure 1:
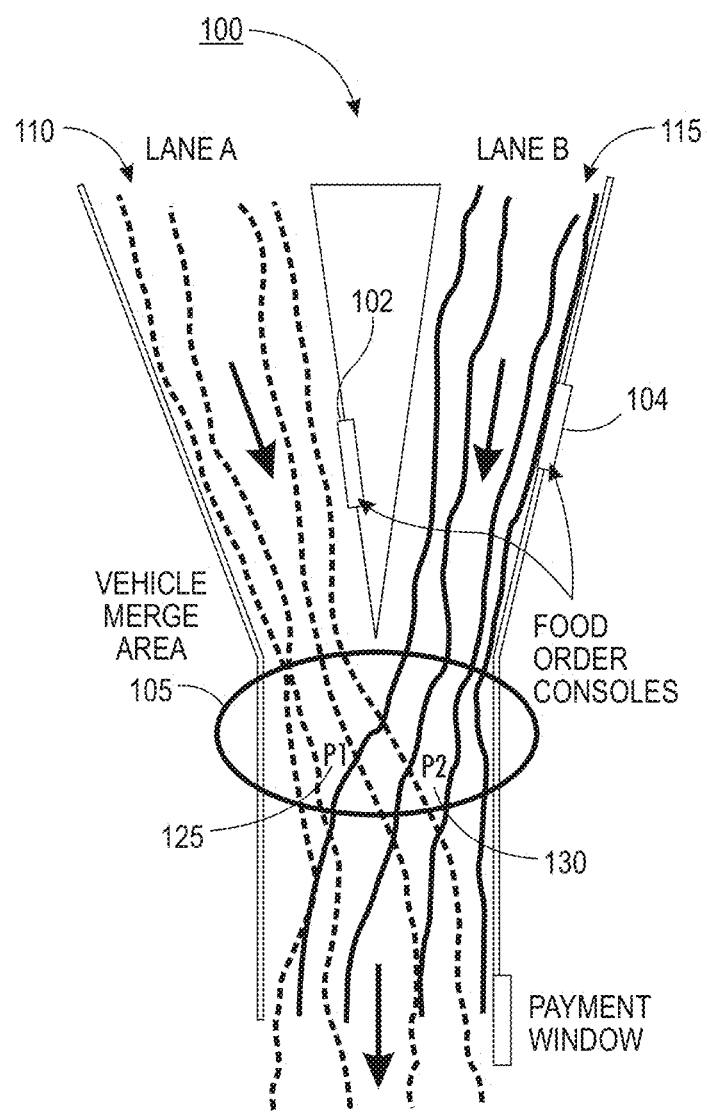
FIG. 1 shows an example view a drive through with a merge point according to the teachings consistent with the present disclosure.

In accordance with implementations of the present disclosure, a video-based method and system for drive-through order management for queued vehicle traffic using images/videos obtained from a fixed video camera is disclosed. In implementations, the automated post-merge sequencing does not directly tag orders to vehicles and then track vehicular movement, but instead establishes fixed reference trip point regions and notes trip point events (i.e. vehicles passing over these regions). The reference trip point regions are selected based on the following conditions. First, when triggered, the lane from which the vehicle has emerged is known with high probability. Second, the position of the triggering points are such that when a vehicle triggers an event (we refer to that vehicle as the "triggering vehicle"), any vehicle that has not yet triggered an event will with high probability merge behind the triggering vehicle.

According to an exemplary method, automated sequencing of vehicles under low speed conditions, e.g., between about 0 and about 30 mph, within a region of interest (ROI) associated with a field of view of an image/video from a video camera is disclosed. A still image/video frame including the merge region is provided where a camera and ROI within a field of view associated with the camera are fixed. The method includes two phases: 1) offline (training) phase, and 2) online (operational) phase. In one exemplary embodiment of the disclosed method, the offline (training) phase includes, a) Obtaining video from a merge area camera; b) Extracting samples from the captured video; and c) Extracting a set of features from the samples and training a classifier using the extracted features for each sample to classify a first region and a second region within the vehicle merge area. The vehicle merge area is located in a area where upstream traffic from a first lane and upstream traffic from a second lane merge to a single lane such that traffic from the first lane and no traffic from the second lane traverse the first area and traffic from the second lane and no traffic from the first lane traverse the second area. During the online (operational) phase of the embodiment, the following steps are performed; d) Obtaining an image/video frame from the camera; e) Detecting the first area and the second area using the classifier trained in the offline phase; and f) Determining the sequence order of vehicles entering the merge area.

As briefly discussed above, the method and system disclosed herein is composed of two phases, 1) offline (training) phase, and 2) online phase. Described now are further details of the vehicle detection method and system to facilitate a better understanding.

According to one exemplary embodiment of the disclosed method, the offline (training) phase includes the following steps:

a) Obtaining video from a camera;
b) Extracting samples from the captured video; and
c) Extracting a set of features from samples and training a classifier using the extracted features for each sample.

The offline process may be performed at the camera installation/setup. Once the video cameras are set-up and the offline processing is completed, vehicles can be localized in each frame using the trained classifier. This is what is referred to as the online phase. In addition, during the online phase the additional traffic data can be incorporated and used to continually adapt and/or refine the performance. In other words the offline process can be run continuously during the online phase.

FIG. 1 shows an example aerial view of a vehicle drive through 100 with vehicle merge area 105. In FIG. 1, lane A 110 with ordering kiosk 102 is shown on the left and lane B 115 with ordering kiosk 104 is shown on the right separated by lane divider 120. The area between the pair of dash-dotted lines have been traversed by at least one vehicle from lane A 110 (dotted) or lane B 115 (solid) and the area between pairs of dotted-dashed lines have been traversed by all vehicles in lane A 110 (dotted) or lane B 115 (solid). P1 125 and P2 130 are regions with the following properties. First, for region P1 125, every vehicle in lane A 110 covers this spot and no vehicle from lane B 115 covers this spot. Second, for region P2 130, every vehicle in lane B 115 covers this spot and no vehicle from lane A 110 covers this spot. If such regions P1 125 and P2 130 that satisfy the above conditions do not exist, then regions that satisfy the above conditions with minimal error rates should be selected.

Figures 2, 3:
FIG. 2 shows an example representation of a drive through area with a merge point according to the teachings consistent with the present disclosure.
FIG. 3 shows an example table illustrating processes according to teachings consistent with the present disclosure.

FIG. 2 shows an example actual view from an installed video surveillance camera at a restaurant drive through. In FIG. 2, vehicle 205 is in lane A 210 and vehicle 215 is in lane B 220 and both near ordering kiosk 225. Regions P1 230 and P2 235 are shown near the merge position 230 of lane A 210 and lane B 220.

The offline (training) phase includes obtaining video from a video camera that comprises a field of view associated with a vehicle merge area 105 or 230 where upstream traffic from a first lane and upstream traffic from a second lane merge to a single lane. The length of the captured video depends on the level of activity in the vehicle merge region to gather enough training samples. For low activity parking regions, video acquired over a relatively longer time frame may be required. If monitoring at night is desired, NIR (near infrared) cameras may be beneficial, and/or the use of external illumination sources. Relatively inexpensive NIR cameras are readily available, as the low-end portion of the near-infrared spectrum, i.e. 700 nm-1000 nm, can be captured with equipment that is designed to capture visible light.

In implementations, more than one camera can be used to capture video of the vehicle merge area 105 or 230. The field of view of the video cameras can be combined using conventional video processing techniques such that a wider area can be imaged and regions P1 230 and P2 235 can be identified from the composite video. Different camera based visual points of view can also result in different regions with different probabilities in inferring the sequence of orders. These separate inferences can be combined for more accurate decision making Once the video is captured, samples with a region of interest (ROI) from the captured video can be extracted either manually or using a hierarchical training approach to determine regions or positions P1 125 and P2 130. Regions P1 125 and P2 130 are chosen such that they satisfy the following conditions. First, if P1 125 is obscured, then there is high probability that it is obscured by a vehicle that is emerging from lane A 110. Second, if P2 130 is obscured, then there is high probability that it is obscured by a vehicle that is emerging from lane B 115. Third, if P1 125 is obscured, then any vehicle in lane B 115 that has not yet obscured P2 130 will be, with high probability, sequenced somewhere after the P1 125 obscuring vehicle once they have merged into a single lane. Fourth, if P2 130 is obscured, then any vehicle in lane A 110 that has not yet obscured P1 125 will be, with high probability, sequenced somewhere after the P2 130 obscuring vehicle once they have merged into a single lane. Fifth, regions P1 125 and P2 130 are not simultaneously obscured (or if so, then only rarely). For example, a high probability can be about 90%, and in particular, can be about 95%. In implementations, regions P1 125 and P2 130 can be represented in the video captured by the video camera as a rectangular, or any other shape, set of pixels, for example, a square of pixels of about 50 pixels by 50 pixels. Other representations of regions P1 125 and P2 130 can also be chosen.

After a sufficient set of samples are collected, a classifier can be trained to determine regions P1 125 and P2 130. The classifier may be trained using a machine optimization approach to seek regions that maximize the probabilities of the conditions being satisfied. The machine optimization approach is achieved by initially extracting a set of features from the collected samples. For example, the number of times each pixel toggles due to the movement of a vehicle can be calculated using an automated foreground object detection technique. A heat map, surface map, or histogram-based map can be determined based on the total number of toggle events that occurred at each pixel location. With this map, regions of lane A 110, lane B 115, and vehicle merged area 105 activity can be identified. Candidate regions for P1 125 and P2 130 can be determined by identifying given window that corresponds to a shape for P1 125 and P2 130 and starting at the high (hot) point of the surface (heat) map near the ordering kiosk 225, sliding along the peak of the surface (heat) map toward vehicle merge 105 as far as possible without overlapping the content for the other lane to identify a candidate location for a region P1 125 or P2 130. The process can be repeated for all traffic lanes leading to vehicle merge area 105.

Once the offline processing is completed, the online phase begins by acquiring images/video frames from the same camera used to classify or determine regions P1 125 and P2 130 for the offline phase and determining the sequence order of vehicles entering the vehicle merge area 105, which is illustrated by example in Table 1, which is shown in FIG. 3, which shows how orders are tracked. In the first column the order is labeled with the lane from which it was placed as well as the sequence within the lane. The second column shows the order according to the time at which the orders were completed (customer was asked to proceed). The third column is the actual resulting sequence of vehicles that pass the pay and pick up windows. It is the third column that we wish to identify so that the orders can be charged and delivered to the customer in a known sequence. To determine this column suppose Order_Lane_B_4 and Order_Lane_A_5 have just completed. Though A_5 completed the order first (second column), there is no guarantee that it will be ahead of B_4. However if P1 125 is the next area to be obscured, then we know it is from a vehicle from Lane A 110 and that P1 125 is far enough ahead so that any vehicle from Lane B 115 that has not triggered P2 130 will be behind the P1 125 triggering vehicle from Lane A 110. If next P2 130 is obscured then that is the next order from Lane B 115. If P1 125 is obscured next then Order_Lane_A_6 is the next vehicle in the sequence. In this way if the five regional conditions itemized above hold then the single lane vehicle sequence can be determined with certainty.

In implementations, regions P1 125 and P2 130 are known and are fixed with respect to the camera(s) and can be highlighted with paint or reflective material. For example, in some embodiments regions P1 125 and P2 130 can be highlighted via some form of powered illumination for improved identification. The marks identifying regions P1 125 and P2 130 can be shaped in any manner to improve the robustness of detection (i.e. is the mark covered or not?). Standard template matching or other computer vision feature/matching method combinations could be used to detect if the area is visible or obscured. Low illumination, for instance as caused by heavy shadows, versus a region being covered by a vehicle may still be distinguished from each other with many standard computer vision methods (again, template matching is one example). In one embodiment, the shapes of the indicators for regions P1 125 and P2 130 may be lines so as to detect smaller vehicles such as motorcycles. Reference images can be updated throughout the day to accommodate for changes in lighting, and weather conditions. The reference images can be recorded at times in which there are no orders in the queue. This allows a certain level of adaptation (i.e. recalibration).

In implementations, the identification of regions P1 125 and P2 130 can be enhanced using vehicles sensing mechanisms, such that vehicles crossing the regions P1 125 and P2 130 can be measured using a variety of approaches/sensors. For example, loops can be embedded in the roadway or standard "hockey-puck" style transportation sensors (vehicle present or absent) can be used. For instance, patterns on the road surface to indicate regions P1 125 and P2 130 could be achieved with low cost road-surface reflectors, which can be removed and reseated much easier than say a loop or even an inset hockey-puck style sensor.

Figure 4:
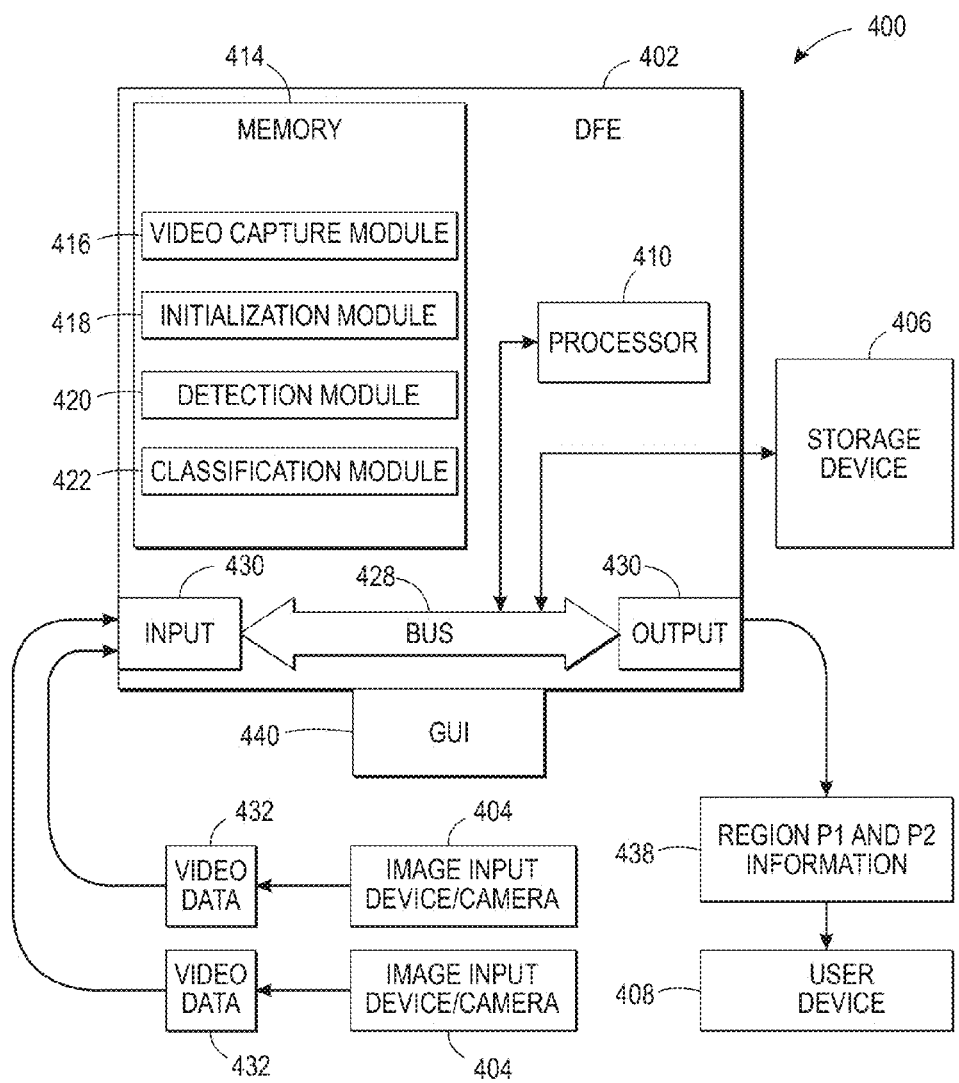
FIG. 4 is a block diagram of a detection system according to an exemplary embodiment of this disclosure.

FIG. 4 is a schematic illustration of a vehicle merge area determination system 400 according to one exemplary embodiment, the system including a region P1 125 and P2 130 detection system as described herein. The system includes a determination device 402, an image capture device 404, and a storage device 406, which may be linked together by communication links, referred to herein as a network. These components are described in greater detail below.

The determination device 402 illustrated in FIG. 4 includes a controller that is part of or associated with the determination device 402. The exemplary controller is adapted for controlling an analysis of video data received by the system 400. The controller includes a processor 410, which controls the overall operation of the determination device 402 by execution of processing instructions that are stored in memory 414 connected to the processor 410.

The memory 414 may represent any type of tangible computer readable medium such as random access memory (RAM), read only memory (ROM), magnetic disk or tape, optical disk, flash memory, or holographic memory. In one embodiment, the memory 414 comprises a combination of random access memory and read only memory. The digital processor 410 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 402, executes instructions stored in memory 414 for performing the parts of a method discussed herein. In some embodiments, the processor 410 and memory 414 may be combined in a single chip.

The determination device 402 may be embodied in a networked device, such as the image capture device 404, although it is also contemplated that the determination device 402 may be located elsewhere on a network to which the system 400 is connected, such as on a central server, a networked computer, or the like, or distributed throughout the network or otherwise accessible thereto. The video data analysis, i.e., region P1 125 and P2 130 detection phases disclosed herein, are performed by the processor 410 according to the instructions contained in the memory 414. In particular, the memory 414 stores a video capture module 416, which captures video data of vehicle merge area 105 of interest; an initialization module 418, which initializes the system; and a region P1 125 and P2 130 detection module 420, which detects regions in the vehicle merge area of interest; a classification module 422, which classify whether a ROI includes a region P1 125 and/or P2 130 in the area of interest. Embodiments are contemplated wherein these instructions can be stored in a single module or as multiple modules embodied in the different devices.

The software modules as used herein, are intended to encompass any collection or set of instructions executable by the determination device 402 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 402 may be all connected by a bus 428.

With continued reference to FIG. 4, the determination device 402 also includes one or more communication interfaces 430, such as network interfaces, for communicating with external devices. The communication interfaces 430 may include, for example, a modem, a router, a cable, and/or Ethernet port, etc. The communication interfaces 430 are adapted to receive video and/or image data 432 as input.

The determination device 402 may include one or more special purpose or general purpose computing devices, such as a server computer or digital front end (DFE), or any other computing device capable of executing instructions for performing the exemplary method.

FIG. 4 further illustrates the determination device 402 connected to an image source 404 for inputting and/or receiving the video data and/or image data (hereinafter collectively referred to as "video data") in electronic format. The image source 404 may include an image capture device, such as a camera. The image source 404 can include one or more surveillance cameras that capture video data from the vehicle merge area of interest. For performing the method at night in parking areas without external sources of illumination, the cameras 404 can include near infrared (NIR) capabilities at the low-end portion of a near-infrared spectrum (700 nm-1000 nm).

In one embodiment, the image source 404 can be a device adapted to relay and/or transmit the video captured by the camera to the determination device 402. For example, the image source 404 can include a scanner, a computer, or the like. In another embodiment, the video data 432 may be input from any suitable source, such as a workstation, a database, a memory storage device, such as a disk, or the like. The image source 404 is in communication with the controller containing the processor 410 and memories 414.

With continued reference to FIG. 4, the system 400 includes a storage device 406 that is part of or in communication with the determination device 402. In a contemplated embodiment, the determination device 402 can be in communication with a server (not shown) that includes a processing device and memory, such as storage device 406.

With continued reference to FIG. 4, the video data 432 undergoes processing by the determination device 402 to output a determination 438 regarding parking space availability to an operator in a suitable form on a graphic user interface (GUI) 440 or to a user device 408, such as a smart phone belonging to a driver in transit or to vehicle computer and/or GPS system, that is in communication with the determination device 402. The GUI 440 can include a display, for displaying information, such as the parking space availability and dimension, to users, and a user input device, such as a keyboard or touch or writable screen, for receiving instructions as input, and/or a cursor control device, such as a mouse, trackball, or the like, for communicating user input information and command selections to the processor 410.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CO-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for determining a sequence order for vehicles in one or more image frames from an operational video, the operational video acquired from a fixed video comprising a field of view associated with a vehicle merge area where upstream traffic from a first lane and upstream traffic from a second lane merge to a single lane, the method comprising:

obtaining operational video from a fixed video camera;
   detecting, within a region of interest (ROI) of the one or more image frames from the operational video, a first area and a second area in the vehicle merge area using a trained classifier that is trained to detect the first area and the second area, wherein traffic from the first lane and no traffic from the second lane traverse the first area and wherein traffic from the second lane and no traffic from the first lane traverse the second area; and
   determining the sequence order of the vehicles based on the first area and the second area that are detected.

2. The computer-implemented method according to claim 1, further comprising training the classifier, wherein training the classifier comprises:

obtaining additional video from the fixed video camera;
extracting one or more samples from the additional video that was obtained;
extracting a set of features from the samples; and
training the classifier via machine optimization techniques to identify spatial regions of the first area and the second area as trip points.

3. The computer-implemented method according to claim 1, wherein the first area is chosen such that if the first area is obscured, then there is a high probability that the first area is obscured by a vehicle that is emerging from the first lane.

4. The computer-implemented method according to claim 1, wherein the second area is chosen such that if the second area is obscured, then there is a high probability that the second area is obscured by a vehicle that is emerging from the second lane.

5. The computer-implemented method according to claim 3, wherein the high probability is at least about 95%.

6. The computer-implemented method according to claim 4, wherein the high probability is at least about 95%.

7. The computer-implemented method according to claim 1, wherein the first area is chosen such that if the first area is obscured, then any vehicle in the second lane that has not obscured the second area will be sequenced somewhere after the first area obscuring vehicle once the first vehicle and the second vehicle have merged into a single lane.

8. The computer-implemented method according to claim 1, wherein the second area is chosen such that if the second area is obscured, then any vehicle in the first lane that has not obscured the first area will be sequenced somewhere after the second area obscuring vehicle once the first vehicle and the second vehicle have merged into a single lane.

9. The computer-implemented method according to claim 1, wherein the first area and the second area are chosen such that the first area and the second area are not simultaneously obscured.

10. A vehicle sequence ordering system associated with a vehicle merge area where upstream traffic from a first lane and upstream traffic from a second lane merge to a single lane region, the system comprising:
a fixed video camera including a field of view associated with the vehicle merge area; and
a controller operatively associated with the fixed video camera, the controller configured to execute computer instructions to perform a process of determining a sequence order for vehicles in one or more image frames from an operational video, the operational video acquired from the fixed video camera comprising a field of view associated with the vehicle merge area comprising:
obtaining operational video from a fixed video camera;
detecting, within a region of interest (ROI) of the one or more image frames from the operational video, a first area and a second area in the vehicle merge area using a trained classifier that is trained to detect the first area and the second area, wherein traffic from the first lane and no traffic from the second lane traverse the first area and wherein traffic from the second lane and no traffic from the first lane traverse the second area; and
determining the sequence order of the vehicles based on the first area and the second area that are detected.

11. The system according to claim 10, wherein the computer instructions further comprise training the classifier, wherein training the classifier comprises:
obtaining additional video from the fixed video camera;
extracting one or more samples from the additional video that was obtained;
extracting a set of features from the samples; and
training the classifier via machine optimization techniques to identify spatial regions of the first area and the second area as trip points.

12. The system according to claim 10, wherein the first area is chosen such that if the first area is obscured, then there is a high probability that the first area is obscured by a vehicle that is emerging from the first lane.

13. The system according to claim 10, wherein the second area is chosen such that if the second area is obscured, then there is a high probability that the second area is obscured by a vehicle that is emerging from the second lane.

14. The system according to claim 10, wherein the first area is chosen such that if the first area is obscured, then any vehicle in the second lane that has not obscured the second area will be sequenced somewhere after the first area obscuring vehicle once the first vehicle and the second vehicle have merged into a single lane.

15. The system according to claim 10, wherein the second area is chosen such that if the second area is obscured, then any vehicle in the first lane that has not obscured the first area will be sequenced somewhere after the second area obscuring vehicle once the first vehicle and the second vehicle have merged into a single lane.

16. The system according to claim 10, wherein the first area and the second area are chosen such that the first area and the second area are not simultaneously obscured.

17. A non-transitory computer readable storage medium comprising instructions that cause one or more processors to perform a method for determining a sequence order for vehicles in one or more image frames from an operational video, the operational video acquired from a fixed video camera comprising a field of view associated with a vehicle merge area where upstream traffic from a first lane and upstream traffic from a second lane merge to a single lane, the method comprising:
obtaining operational video from the fixed video camera;
detecting, within a region of interest (ROI) of the one or more image frames from the operational video, a first area and a second area in the vehicle merge area using a trained classifier that is trained to detect the first area and the second area, wherein traffic from the first lane and no traffic from the second lane traverse the first area and wherein traffic from the second lane and no traffic from the first lane traverse the second area; and
determining the sequence order of the vehicles based on the first area and the second area that are detected.

18. The non-transitory computer readable storage medium according to claim 17, wherein the first area is chosen such that if the first area is obscured, then there is a high probability that the first area is obscured by a vehicle that is emerging from the first lane.

19. The non-transitory computer readable storage medium according to claim 17, wherein the second area is chosen such that if the second area is obscured, then there is a high probability that the second area is obscured by a vehicle that is emerging from the second lane.

* * * * *